(12) United States Patent  (10) Patent No.: US 7,988,555 B2
Mueller  (45) Date of Patent: Aug. 2, 2011

(54) METHOD AND DEVICE FOR CONTROLLING A MOTION-SEQUENCE WITHIN A SIMULATED GAME OR SPORTS EVENT

(75) Inventor: Christian Mueller, Stallikon (CH)

(73) Assignee: Empire of Sports Developments LTD., George Town, Grand Cayman (KY)

( * ) Notice: Subject to any disclaimer, the term of this patent is extended or adjusted under 35 U.S.C. 154(b) by 684 days.

(21) Appl. No.: 11/829,477

(22) Filed: Jul. 27, 2007

(65) Prior Publication Data

US 2009/0042647 A1  Feb. 12, 2009

(51) Int. Cl.
  *G06F 19/00*  (2011.01)
(52) U.S. Cl. .......................................... 463/31
(58) Field of Classification Search .................. 463/31
See application file for complete search history.

(56) References Cited

U.S. PATENT DOCUMENTS

| | | |
|---|---|---|
| 4,672,541 A | 6/1987 | Bromley et al. |
| 5,692,956 A | 12/1997 | Rifkin |
| 6,091,401 A | 7/2000 | Chen et al. |
| 6,196,917 B1 | 3/2001 | Mathias et al. |
| 6,320,582 B1 | 11/2001 | Yamamoto et al. |
| 6,494,783 B2 | 12/2002 | Namba et al. |
| 6,688,974 B2 | 2/2004 | Fujioka et al. |
| 6,705,972 B1 | 3/2004 | Takano et al. |
| 6,884,163 B2 | 4/2005 | Namba et al. |
| 6,933,924 B2 | 8/2005 | Garcia |
| 7,022,014 B2 | 4/2006 | Namba et al. |
| 7,033,269 B2 | 4/2006 | Namba et al. |
| 7,133,026 B2 | 11/2006 | Horie et al. |
| 2001/0005689 A1 | 6/2001 | Fujioka et al. |
| 2002/0177477 A1* | 11/2002 | Okitsu et al. ................ 463/3 |
| 2003/0214484 A1 | 11/2003 | Haywood |
| 2004/0023717 A1* | 2/2004 | Tsuda et al. ................. 463/30 |
| 2004/0214623 A1* | 10/2004 | Takahashi et al. ........... 463/2 |
| 2006/0178212 A1 | 8/2006 | Penzias |
| 2009/0275371 A1* | 11/2009 | Takahashi et al. .......... 463/3 |

FOREIGN PATENT DOCUMENTS

WO  0222224  3/2002

* cited by examiner

*Primary Examiner* — Dmitry Suhol
*Assistant Examiner* — Malina K Rustemeyer
(74) *Attorney, Agent, or Firm* — Knobbe, Martens, Olson & Bear LLP (57) ABSTRACT

The invention relates to a method for the control of the movement course of an object (23) represented on a display device (12), which within the framework of a ball game or sport event simulated by a computation unit (11) is to move from a starting point (16) into another region of the environment indicated on the display device (12).

The control is improved in that for determining the target, in a first step, a predefined target area (18) of a certain scope and shape is made available by the computation unit, and is represented on the display device, that in a second step the prepared target area is positioned by a playing person by way of an input unit (15), in the environment of the starting point (16) displayed on the display device (12), and that in a third step the object (23) is moved by the computation unit (11) on a movement path (20) from the starting point (16) to an end point lying in the target area (18), wherein the position of the end point within the target area (18) is determined according to a random principle.

21 Claims, 8 Drawing Sheets

METHOD AND DEVICE FOR CONTROLLING A MOTION-SEQUENCE WITHIN A SIMULATED GAME OR SPORTS EVENT

TECHNICAL FIELD

The present invention relates to a method as well as to a device for the control of a course of movement within the course of a simulated game or sport event.

Thereby, the present invention is chiefly concerned with the improved, optical representation of moved elements or objects which, based on process parameters, are to be moved by an operating person in a quick and precise manner, from a first into a second position.

STATE OF THE ART

The most varied of computer interfaces such as computer mice, keyboard, joysticks, game console controllers etc., are known from the state of the art, which permit the user interactions with the computer, and in particular with the optical display on such computers.

Here, computers are to be understood as actual personal computers, but also as other computer-based apparatus such as notebooks, handhelds, smartphones or game consoles, which have a display device (screen) and person-operated input elements (keyboard, mouse etc.) or interfaces for such.

For example, a method and a device are known from U.S. Pat. No. 7,033,269, which, within the course of a baseball computer game, permit the target direction and strike type of a ball or other object to be simultaneously set. The target direction and the strike type thereby are initiated by way of an input apparatus, e.g. a computer mouse, by way setting the movement direction of this input apparatus, and activation by way of an operating key, e.g. clicking the left mouse button.

Two further documents are related to the previously mentioned publication, specifically U.S. Pat. No. 7,022,014 and U.S. Pat. No. 6,494,783, which likewise both concern the game control for a baseball game. U.S. Pat. No. 7,022,014 discloses a method for game control with which, in a baseball game computer, the instructions for the hit are influenced by way of the display of a ball contact cursor position within a hit zone, and computed. U.S. Pat. No. 6,494,783 also discloses methods for the game control for a baseball game computer, wherein here, the position of a virtual ball relative to a virtual bat may be changed by way of a suitable mouse movement, so that the ball hit is influenced by way of this.

A method and an interface are known from U.S. Pat. No. 6,196,917, which, within the course of a computer game, permit several objects (players) to be moved in the direction of a target position. One pointer apparatus thereby sets the coordinate positions on the display, which determine the movement direction of the objects. That solution is concerned with the movement of a plurality of objects moved independently of one another. The object concerned moves without further influence of the operating person, to the set coordinate position in accordance with the respective coordinate positions.

These interfaces and methods for interface control known from the state of the art thus have two different movement principles. Either the objects which may be activated on the graphic interface may be moved in a release-defined manner by the operating person, i.e. the object provided with certain characteristics is released at a certain starting point (e.g. the ball characterised by certain movement attributes), and its movement or target position is computed thereupon, or a precise target point is set in a fixed manner (target defined) for the object, to which the object moves without further influence on the part of the operating person. It is possible in both cases for hindrance variables (e.g. obstacles or virtual players etc) to yet influence the object movement after the movement initiation by the player. The operating person himself no longer has any influence on the movement in this phase.

The second case with a fixed setting of a target point of the movement, and this may be a set coordinate or a certain target object, may only be used for very simple simulations or virtual surroundings, since no flexible parameterisation of the object movement is possible. The characteristics of the objects play no part or only a small part in the movement, since the movement is fixed on setting a fixed target point. Such controls may be indicated as "non-parameterised movement"-controls or NPM-controls, and are not considered further within the scope of the invention, since such NPM-controls permit no near-reality simulations or representations of virtual environments, and may only be utilised for trivial systems.

The first group of cases, with which object parameters are fixed at a starting point and from which the object movement is then computed in a computer-aided manner, within the scope of this description, is indicated as "initial-parameterised release movement"-control or IPRM-control for short. IPRM-controls are known with computer games as well as in the field of robotics, and today are typically applied in complex virtual environments. Rules with regard to programming determine the course of movement after the release of the object with IPRM-controls.

IPRM-controls have the disadvantage, that with an increasing complexity of the movement parameterisation, on the one hand the operating person is overwhelmed with the cognitive perception and input of the multitude of parameters, i.e. either consciously or subconsciously reduces these or shuts these out, and on the other hand one may only achieve unsatisfactory results for the movement target, on account of the object movement which may no longer be influenced after the object release, specifically in complex simulation environments. Ideas such as disclosed in U.S. Pat. No. 6,196,917, which set a defined target position, are accordingly unsuitable or may be used only in a limited manner when the simulation environment changes after initiation of the NPM-control. Both ideas are accordingly disadvantageous and greatly restricted in complex, dynamic simulation environments or virtual environments. Specifically, the limits of cognition of the operating person with rapid sequences does not permit any near-reality, exact operation of a graphic simulation or virtual reality.

Furthermore, a shooter game under the description "shadow run" is known from the state of the art, with which one may shoot at enemy game figures with different weapons. The playing person thereby as an individual player is active and sees the scenery from the view of a helmet camera, which swings onto the target on aiming the weapon. One aims by way of a circle which specifies the field in which the fired shot may hit. The size of the circle depends on the skill of the player as well as the selected weapon. The circle furthermore increases briefly (dynamically), when the player carries out a rapid swinging movement before the shot, i.e. shoots whilst swinging. This changing circle is used directly for aiming and is applied where possible on the enemy game figure, directly before the shot is triggered. This does not entail a continuous game sequence as is present with a ball exchange or team-related ball game.

Another known game "Tiger Woods PGA Tour 2007" is designed as a golf simulation. Here, a circular target area is set before teeing off, whose size depends on the type of selected club and on the skill of the player. The target area may be placed in the whole region of the respective hole, and indicates where the struck ball may randomly occur. In this case too, a game between several persons is no longer given, with which a dynamically changing activity takes its course within the course of a ball exchange or ball relay, with which the playing person himself may target, receive a ball and play a ball whilst taking into account the position of other game figures, within a short time.

DESCRIPTION OF THE INVENTION

It is the object of the invention to provide a method and a device for the interface-control which permits an operating person to move complexly parameterised objects on a graphic user surface with an improved accuracy, and to simultaneously be able to have an improved influence on movements which change rapidly in a temporal and dynamic manner on a display device.

The features of the independent patent claims 1 and 14 achieve this object.

The inventive idea assumes that IPR-movements are capable of providing adequate results in simple simulations or virtual surroundings, but overwhelm the operating person in more complex environments, and specifically do not permit the operating person to react to his intuitively anticipated situation changes. The inventive idea may be described in a simplified manner by way of a "target-parameterised release movement control" or TPRM-control for short. Thereby, differently to IPRM-controls, the movement control is not set by way of initial object parameters at the starting point of the object, but the operating person defines object parameters at the target point of the object. Thereby, no fixed target point within the context of a defined target coordinate is set (NPM-controls), but the operating person positions a parameterised target area. It is then essential that the target area in its scope and shape is computed in an automated manner with regard to hardware and software, so that the operating person is not exposed to a cognitive overload for converting the target parameters.

Thus for determining the target, a defined target area of a certain scope and shape is prepared by the computation unit in a first step, and is represented on a display device. In a second step, the prepared target area is positioned in the environment of the starting point displayed on the display device, by a playing person by way of an input unit. In a third step, the object is moved by the computation unit on a movement path from a starting point to an end point lying in the target area, wherein the position of the end point within the target area is fixed by way of the computation unit according to a random principle.

One embodiment of the method according to the invention is characterised in that the scope and/or the shape of the target area and/or the movement path is changeable and depends on one or more parameters, wherein in particular the scope and/or the shape of the positioned target area changes before the end point lying in the target area is fixed.

The starting point thereby may be changed between the second and the third step by the playing person by way of an input unit, wherein the computation unit changes the scope and/or the shape of the positioned target area in accordance with the change of the starting point as a parameter.

According to another design of the invention, the playing person sets a hit intensity for the movement of the object from the starting point to an end point lying in the target area, by way of an input unit, before the third step, wherein the computation unit changes the scope and/or the shape of the target area and/or the movement path in accordance with the set hit intensity as a parameter.

It is particularly the scope of the target area which increases with the set hit intensity.

One further design is characterised in that the playing person sets a hit type for the movement of the object from the starting point to an end point lying in the target area by way of an input unit, and that the scope and/or the shape of the target area and/or the movement path changes in accordance with the set hit type as a parameter.

Furthermore, it is conceivable within the framework of the invention, within the second step, for the target area to be moved into the desired position in a first part step, and for the position of the target area to be confirmed by the playing person and thus fixed in a second part step.

As an input unit, one may particularly use a mouse, wherein the target area is positioned with the movement of the mouse, and subsequently the positioned target area is fixed in the reached position by way of pressing a mouse button.

Another design of the invention is characterised in that the starting point of the movement path is determined by a moving figure, which may be moved by the playing person in the surroundings displayed on the display device, by way of an input device, that the moving figure is designed as an avatar to which changing characteristics and/or attributes are assigned, and that parameters for influencing the scope and/or shape of the target area may be derived from the changing characteristics and/or attributes of the avatar.

If the simulated ball game or sport event takes its course on a plane playing field, then the target area is preferably a two-dimensional surface The target area may however also be a three-dimensional spatial region.

One preferred design of the device according to the invention is characterised in that some of the parameters on which the extension and/or the shape of the target area depend, may be influenced by the input device.

In particular, a parameter device which may be connected to the computation unit is provided, in which parameters on which the scope and/or shape of the target area depend, or data for the computation of such parameters, are stored.

Preferably the parameter device is equipped with a display for representing a target area dependent on the stored parameters or data, and/or operating buttons for independent operation of the parameter device.

Embodiment examples of the invention are described by way of the subsequent figures. There are shown in:

FIG. 3a to 3d in several part figures, different steps with the control of the course of the game within the framework of the invention, with a tennis game of the type shown in FIG. 2a.

Figure 1:
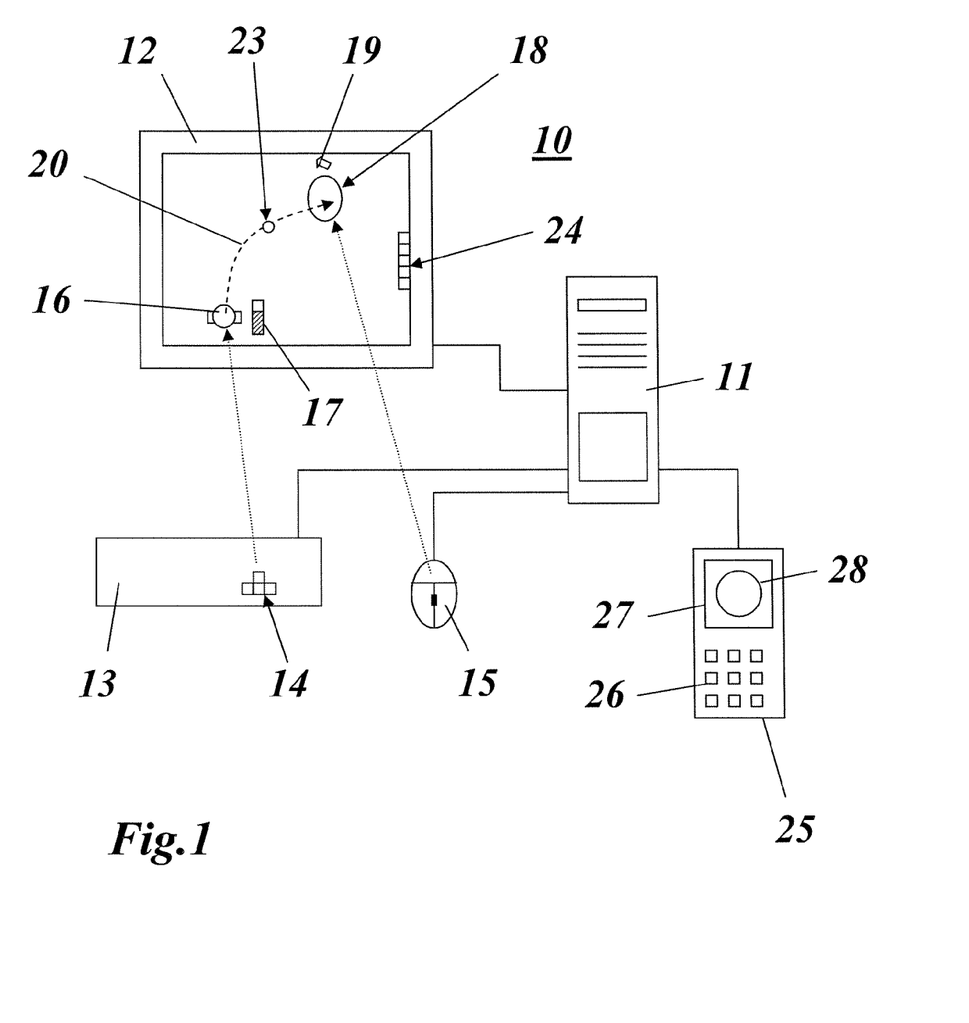
FIG. 1 an exemplary device for the simulation of a game or a sport event, as is suitable for carrying out the control method according to the invention.
Figure 2A:
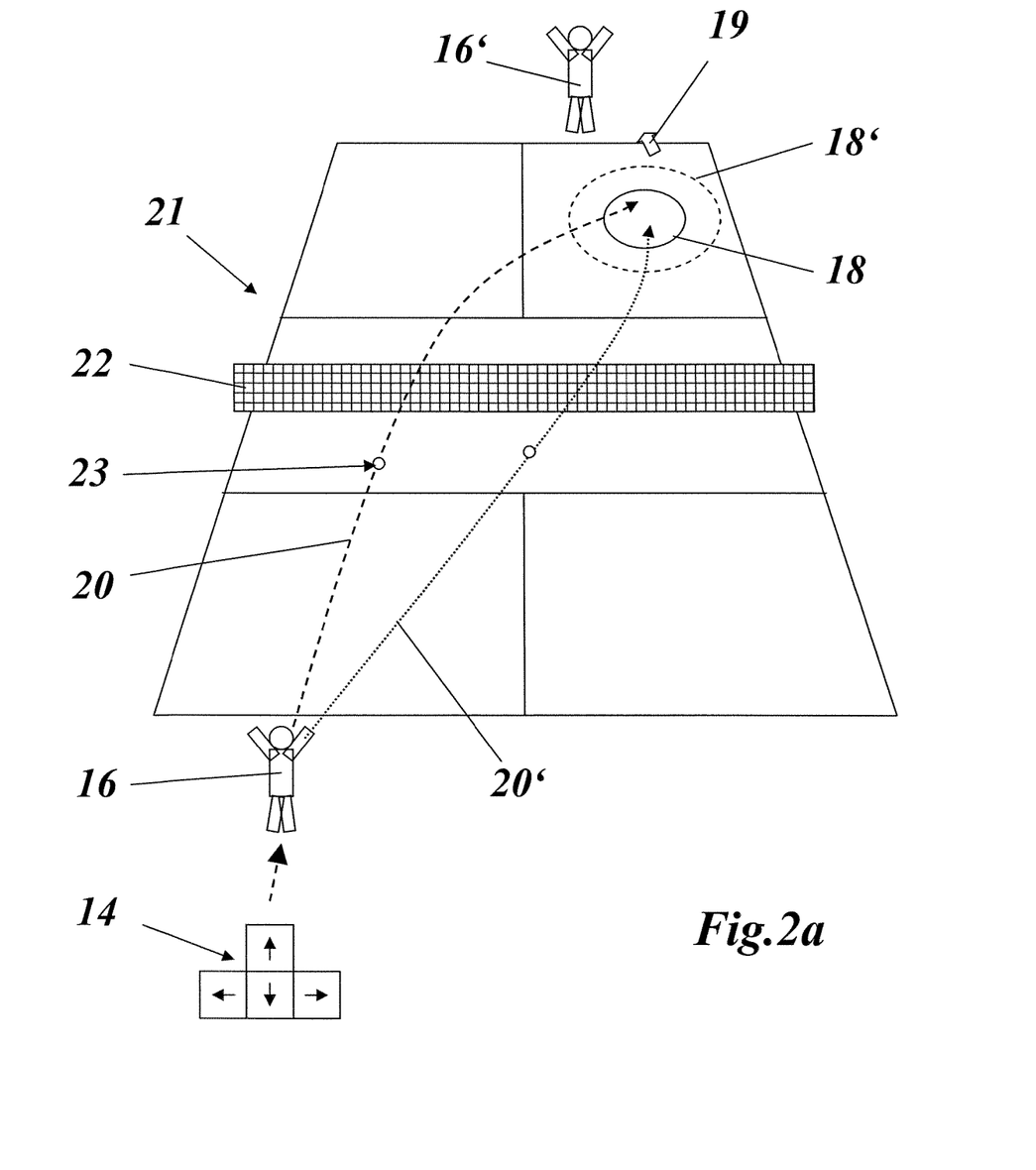
FIG. 2a a game situation represented with the example of a tennis game, for explaining the principles of the control method according to the invention FIG. 2b, in an enlarged representation, one exemplary target area with end points of the movement path which are drawn therein, as occur within the framework of the control method according to the invention.
Figure 3A:
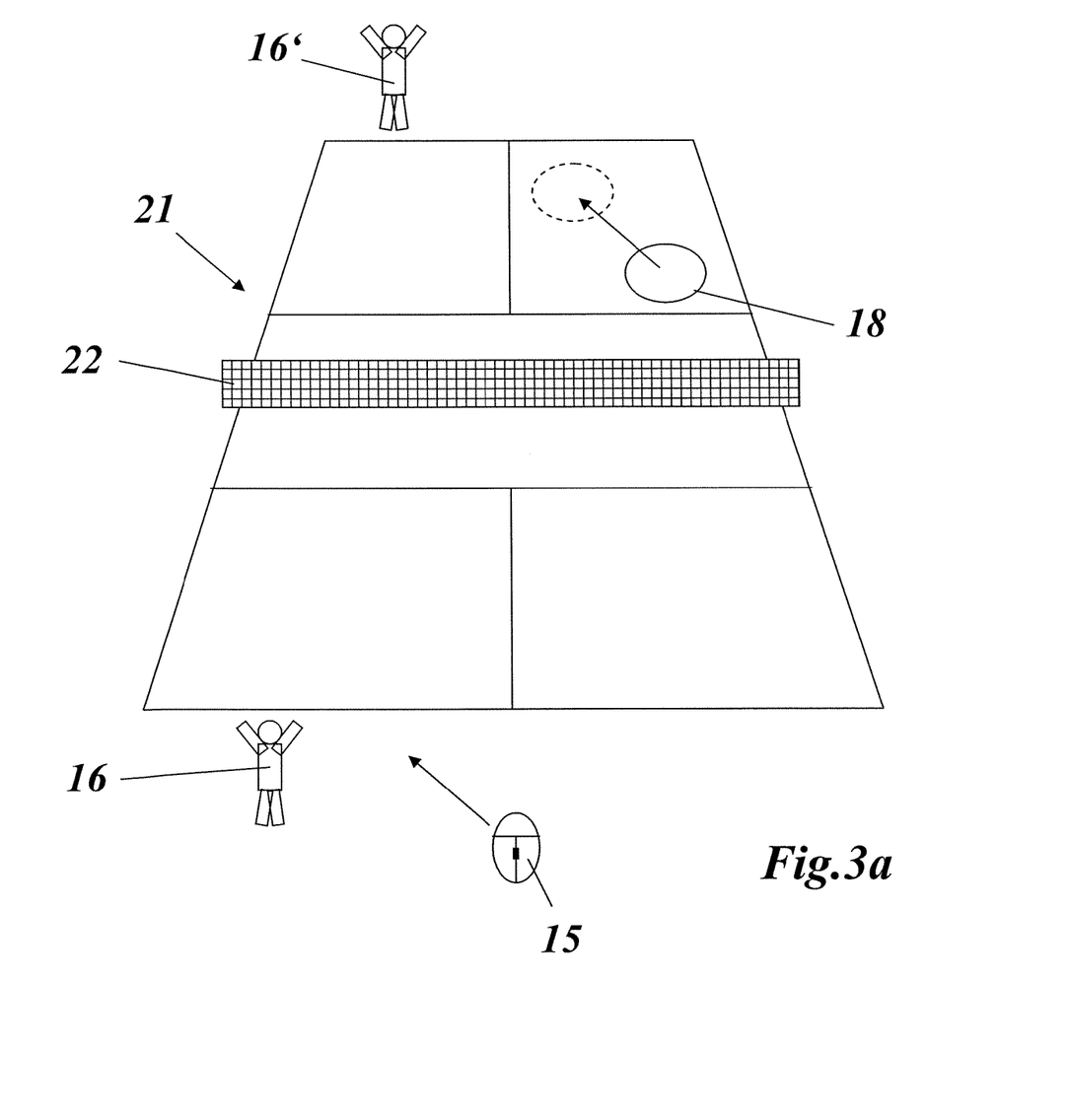
Figure 3B:
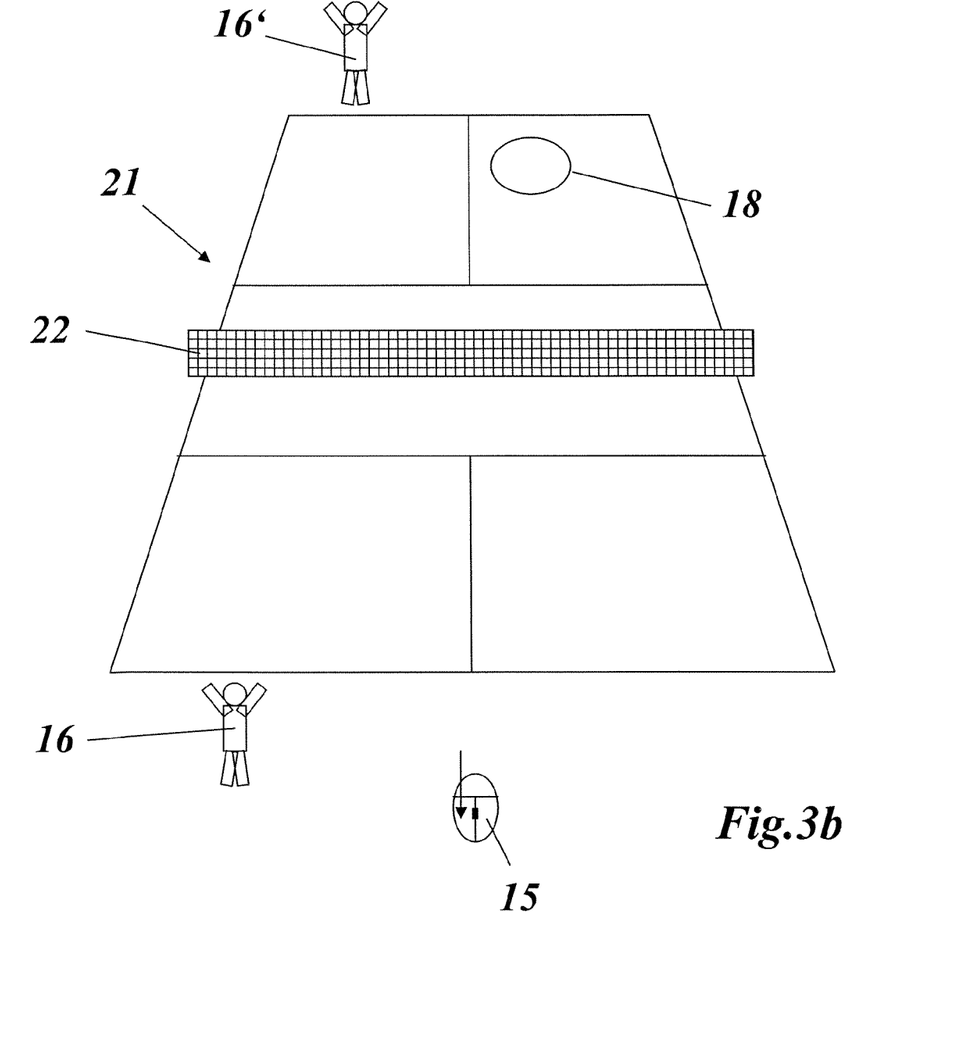

An exemplary device for the simulation of a game or sport event according to the invention is represented in FIG. 1, as is suitable for carrying out the control method according to the invention. The simulation device 10 comprises a display device 12 for representing the game situation with the FIG. 16 acting therein. With a game such as tennis, football, basketball or baseball for example, with which either a team of several figures occurs, or with games or sport events with which several opponents compete against one another, simultaneously several figures (game figures) 16, 16' are represented in the display device 12 (see the tennis game of FIGS. 2 and 3). The display device 13 may for example be a screen or TV-screen or the display of a portable computer.

The game action represented on the display device 12 is simulated with the help of a computation unit 11, which is in connection with the display device 12 (wireless or wire-connected). The computation unit 11 may for example be a PC—as indicated in FIG. 1. With regard to the computation unit 11, it may also be the case of a computation unit integrated into a game console or a portable electronic apparatus. One or more input units 13, . . . , 15 are connected to the computation unit 11 from the outside, for the control of the events of a game by a person. In the example of FIG. 1, one input unit is formed as a mouse 15, another input unit as a keyboard 13. The keyboard 13 preferably comprises a block with direction keys (arrow keys) which are applied in particular for the control of the movement of the figure (game figure) 16 represented in the display, as is indicated in FIG. 1 by the dotted arrow. The movement of the FIG. 16 may however also be effected by way of the mouse 15.

The central procedure of the control method according to the invention is to move a moving object, e.g. a ball 23, proceeding from a dynamically changing starting point, into another region of the represented environment, in a manner which may be influenced by the playing person, within the game or sport action simulated by the computation unit 11 and represented on the display device 12, wherein this movement on the one hand is to be burdened with realistic errors and inaccuracies, and on the other hand is to be influenced in a rapid and simple manner during the running game. In course of the game of FIG. 1, FIG. 16 which for example is a tennis player, thrower or football player, hits, throws or kicks the ball 23, serves as a starting point for the movement path 20 (drawn in a dashed manner) of the ball 23.

The movement path (trajectory) 20 of the ball 23, with the invention, is now not fixed by way of the input of the necessary starting parameters (strike direction, initial speed, engagement point of the hit force with an out-of centre hit on the ball imaged as a ball etc.) and computed in accordance with the starting parameters by way of the computation unit 11 (IPRM-control). Also, an exact target point or end point of the movement path 20 is also not fixed or set by the controlling player (NPM-control). Rather, the player may displace a target area 18 of a defined scope and shape (circle, ellipse, ball, ellipsoid etc) which is bound to the cursor 19 and may be displaced together with the mouse cursor 19, in the environment represented by the display device 12, to where the movements path 20 of the ball 23 is to end, or the ball 23 is to hit (see also FIG. 2a).

Figure 2B:
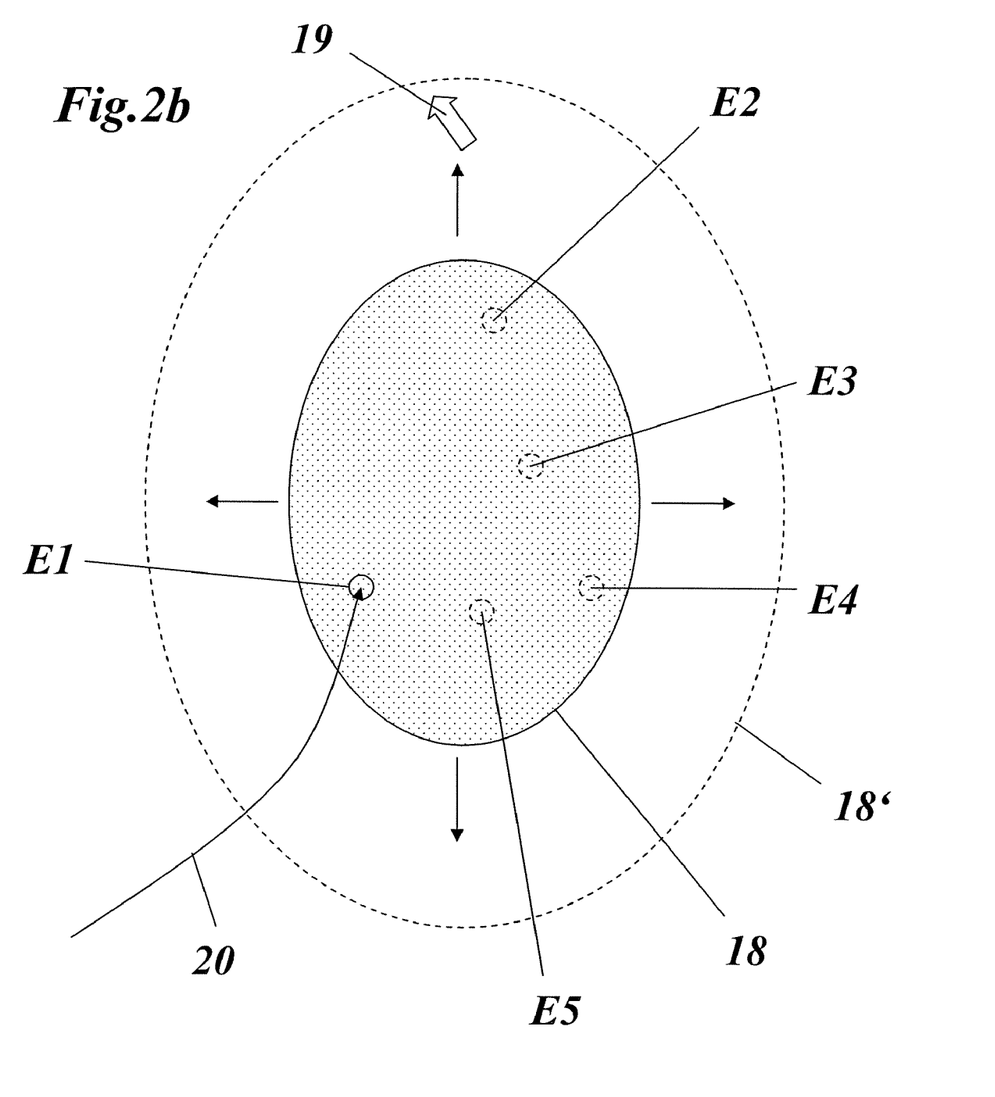

As to where the end point (E1, . . . , E5 in FIG. 2b) of the movement path 20 precisely lies in the target area 18, is computed afresh for each movement path 20 of the ball 23 by the computation unit 11 with the help of a random generator and preferably in accordance with a probability distribution within the target area 18. If the end point is established (E1 in FIG. 2b), a movement path 20 is assigned to the ball 23 by the computation unit 11, which begins at the starting point (FIG. 16) and ends in the established end point (E1 in FIG. 2b) within the target area 18. The actual movement path 20 thereby preferably depends on parameters such as the type of hit or strike (with tennis e.g. serve, smash, top-spin etc.), any occurring side wind or a hypothetical physical constitution (size, arm length, muscle force, training condition, fatigue etc.) of FIG. 16 etc. It is of course, to be understood that obstacles lying in the movement path 20 (the net 22 in FIG. 2a for example with tennis) are taken into account, and change the movement path (e.g. by way of the impact of the ball at the net). Likewise, limitations of a playing field are taken into account. If the target area 18 overlaps such a limitation, and the end point selected by the computation unit 11 lies outside the limitation, then consequences envisaged in the rules for the respective game are drawn.

A typical control sequence within a proceeding ball exchange with tennis, then according to FIG. 3a to 3d is as follows:

Firstly, the player with the mouse 15 displaces a target area 18 of a given scope and shape on the displayed playing field, to where the ball 23 or a comparable moved object is to roughly hit. The scope and the shape of the target area 18 at this point in time result from a default mode which is fixed by previous ball movements and movements of FIG. 16, as well as by parameters (game duration, physical constitution, or experience of FIG. 16 etc) which may not be directly influenced by the player. The target area 18 usually has the shape of a circle (FIG. 3a) with a two-dimensional playing field in the default-mode, The displaced target area 18 is fixed in the reached position by way of clicking the mouse 15 (symbolised in FIG. 3b by the arrow directed perpendicularly on the mouse). Simultaneously, the type of hit or strike may be selected by way of the type of clicking (left button once, right button once, left button twice, right button twice, both buttons simultaneously) (e.g. with tennis, flat stroke or flat serve or flat smash, top spin stroke or topspin serve or topspin smash, slice shot or slice serve or slice smash, drop shot, lob). The selected type of the hit or strike then essentially enters the evaluation of the later movement path 20. Alternatively, a selection display 24 (FIG. 1) may be provided alternatively on the display device 12 in the manner of a menu, from which an option for the hit type may be selected with the help of the mouse 15.

The intensity with which the ball 23 is played, may be increased in a type of "charging procedure" by way of pressing a key (e.g. the space bar) of the keyboard 13 or clicking on the mouse 15. The hit intensity increases for as long as this key (or mouse) is held pressed. A bar next to the FIG. 16 and which increases in length serves as an intensity display 17 (FIG. 1). If the hit intensity increases, the scope of the target area (the target area 18 in FIG. 2a or 2b merges into the target area 18') changes (increases), A ball 23 is then played on the movement path 20 into the players own area (FIG. 3c) by the opponent FIG. 16'. In anticipation of the possible movement path or on account of the represented movement path 20, the player firstly moves the FIG. 16 by way of the direction keys of the keyboard 13, to where it stands close to the movement path or in the movement path, in order to be able to return the ball 23. The starting point of the subsequent movement path 20 of the ball 23 to the position in the represented environment desired by him is also determined on positioning FIG. 16. The type and rapidity of the movement of the FIG. 16 may thereby be stored, and be used as parameters for influencing the scope and the shape of the target area 18 in the next step (e.g. a rapid, late movement of the FIG. 16 before the hit, increases the scope of the target area 18, since the inaccuracy of a hit out of a movement is greater in reality). The starting point of the movement path is only fixed in this manner after the target area for the possible end point of the movement path has already been placed and fixed.

If FIG. 16 is in reach of the approaching ball, the hit is carried out and the computation unit 11 simulates a movement of the ball 23 on the virtual movement path 20 from the starting point into end point subjected to randomness, in the positioned target area 18 or 18'. It is alternatively also conceivable for the execution of the hit to be effected by way of pressing the mouse button (or the space bar) or—after the effected charging of the hit intensity—by way of releasing the pressed mouse button (arrow in FIG. 3*d* pointing away from the mouse 15) or the pressed space bar.

If with regard to the simulated game, it is the case of a game of tennis, as is shown for example in FIGS. 2 and 3, then two FIGS. 16 and 16' playing against one another are present, which hit the ball to and fro within a limited plying field 21 over a net 22. The one FIG. 16 is moved and positioned by the playing person via the four direction keys (e.g. arrow keys) 14 of the keyboard 13, wherein preferably 8 different directions may be selected with the four keys (the four main directions of the individual keys and four diagonal directions by way of combination of in each case two keys offset by 90° to one another). One may also use another input unit instead of the keyboard 12. In particular, the mouse 15 itself may be used for positioning the FIG. 16. The other opponent FIG. 16' is either controlled by another playing person, or is moved autonomously by the computation unit 11 according to programmed procedures.

The target for the ball to be played is set with the mouse curser 19 of the mouse 15. A circle represented below the mouse cursor 19 and moved together with the mouse cursor 19 symbolises the target area 18 for the standard hit (the flat stroke). The shape of the target area 18 may be dependent on the selected position (the closer the target area 18 to an edge boundary, the greater the risk is of hitting the ball out). If the target area 18 is positioned in the desired manner (FIG. 3), then the positioning is confirmed (FIG. 3*b*) by way of clicking on the mouse 15. If the player selects a different hit type instead of the standard hit (e.g. a topspin smash instead of a flat stroke), then the target area 18 changes in its scope and/or shape (the target area may e.g. be oval for a lob). The movement path of the ball 23 may also change (from 20 to 20' in FIG. 2*a*) with the selection of another hit type, inasmuch as this changed movement path is permissible on account of the constraints.

Figure 3C:
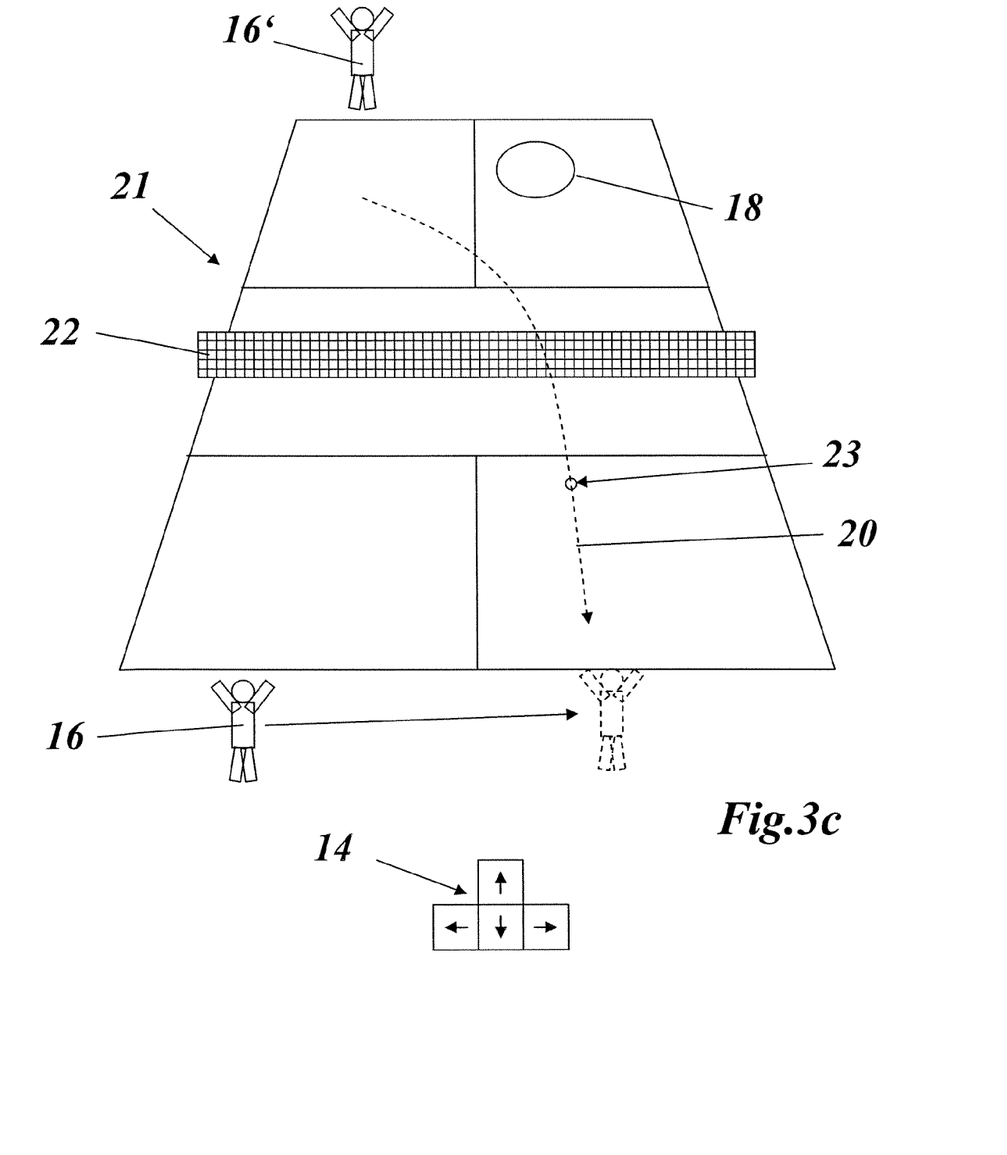
Figure 3D:
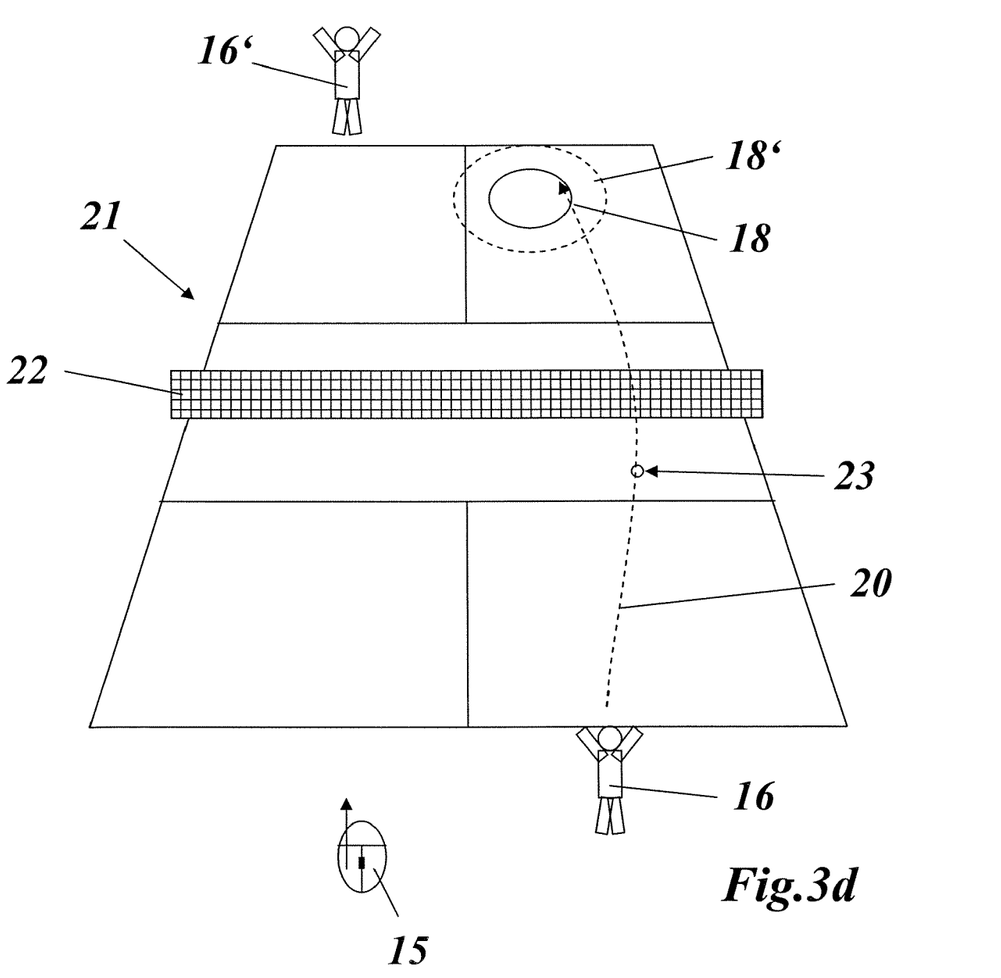

A player may increase the intensity and the speed of his hit by way of the type of charging procedure. He must predict to where the ball 23 moves, in order to displace the figure played by him into the movement path 20 of the ball 23 (FIG. 3*c*). Simultaneously, he must begin the "charging procedure" early enough, in order to carry out a forceful hit. The "charging procedure" is preferably to be carried out by way of a forceful hit. The "charging procedure" is preferably carried out by way of pressing and keeping pressed the space bar (or the mouse 15), by which means the target area 18 changes in dependence on the charging process (from 18 to 18' in FIG. 3*d*) The setting of the hit intensity may however also be effected with the mouse.

Basically, the following may be said of the dependence of the target area 18 on the other parameters with the game of tennis:

The scope of the target area 18 depends on the selected stroke type, on the position of the target area in the game field, on the "charged" hit intensity, on the movements of the figure before the hit, and the time between the target positioning and hit;

The target area 18 reduces in size when the player playing the figure does nothing;

The target area 18 increases in size when the hit intensity is increased by "charging" or when the figure is rapidly moved.

A further important dependency of the target area on other parameters may be introduced by way of designing or seeing the game FIGS. 16, 16' of the game as avatars, which have certain partially changing characteristics and attributes. Selected characteristics or attributes of the avatar may then influence the scope and shape of the target area 18 in a direct manner or via parameters derived therefrom. Thus for example, the target accuracy may be improved by way of undergone training units or already completed games of the avatar (size reduction of the target area). The avatar may however also be equipped with a metabolism, which has an effect on the daily performance, the fatigue during the game or the overall constitution. Thus for example, the force of the avatar which reduces after a long duration of game may have an effect on the maximal hit force which is available, and further on the target area.

Furthermore, equipment objects such as bats or shoes may be used for parameterising the target area, which interacting with the ball or the surface of the playing field, may influence the targeting accuracy.

The parameterisation of the target area is of course not limited to special games such as tennis, but may also be used in particular with football, baseball, basketball or likewise. With a game such as tennis, the target area is usually two-dimensional, i.e. it is a region defined in the plane of the playing field. With football, the target area may likewise be two-dimensional, but here one must already use two different planes, specifically the plane of the playing field (for ball movements between the goals) and the planes of the goal opening limited by the goal posts and the crossbar (for shot to the goal) which are perpendicular thereto. In other cases, (e.g. with the game of basketball) it is useful and advantageous to use a 3-dimensional target area which in the simplest case may be designed as a ball, and in other cases as a body of revolution (e.g. ellipsoid).

Apart from the exemplary tennis game shown in FIGS. 2 and 3, with which two opponents or FIGS. 16 and 16' play against one another, other game procedures such as for example a team game are of course also conceivable, in which two game figure pass the ball in a conscious manner. In the FIGS. 4*a* to 4*b*, the principle of the target-parameterised release movement control TPRM-control is schematically shown by way of a simulation environment with two game figures of a team and a ball played between the two game figures.

The display device 12 already known from FIG. 1, with a graphic user surface may be recognised for an operating person (not shown). The display device 12 is represented in FIG. 4*a* at a first point in time to, in FIG. 4*b* at a subsequent second point in time $t_1$.

A first active object $AO_1$ and a second active object $AO_2$ are visible on the user surface, which are represented in an abstract manner as a pentagon, and may be seen as game figures. Both active objects $AO_1$ and $AO_2$ may be stationary or static or also movable. In the present case, both active objects $AO_1$ and $AO_2$ are movable, and at the first point in time are also effective in movement, which is indicated by movement arrows 1, 2 and 3. The first active object $AO_1$ is moved in the direction of the arrow 1 and the second active object $AO_2$ is moved in the direction of the arrow 2.

Each of the two active objects $AO_1$ and $AO_2$ have characteristics which may temporally change, i.e. the object characteristics are not necessarily identical at the first and at the second point in time. Here for example, the two active objects $AO_1$ and $AO_2$ may be understood as avatars for a simpler understanding. Each avatar has a multitude of characteristics, such as e.g. age, energy, quickness, movement etc. The term "active object" thus describes the possibility of these objects $AO_1$ and $AO_2$ being able to be controlled by the operating person, such that these in the context of a subject, may influence other objects in the simulation environment.

Figure 4A:
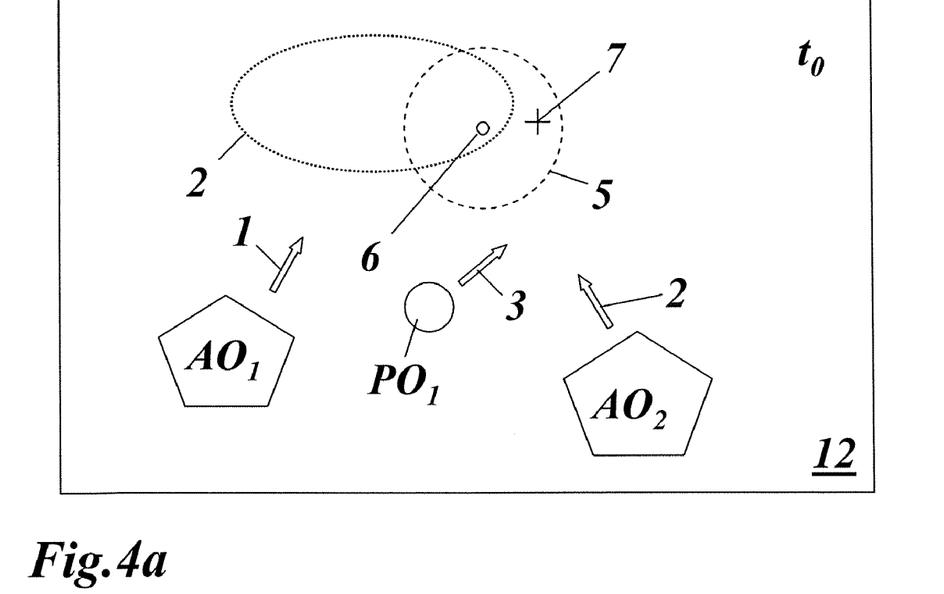
FIG. 4a to 4b in two part figures, a principle representation of a target-parameterised release movement control, for the general case of a ball played from a first figure to a second figure.

In contrast to this are so-called passive objects, such as e.g. a passive object $PO_1$ which is represented in FIG. 4 as a circle object. For a simpler understanding, the passive object $PO_1$ here is to be assumed as a ball, which moves in the direction of the arrow 3. It may however be a sports apparatus, such as a spear or an arrow shot with a bow. In this specific example case, the ball $PO_1$ would not be able to be directly influenced by the operating person, but only by way of its avatar, for example the active object $AO_2$.

Figure 4B:
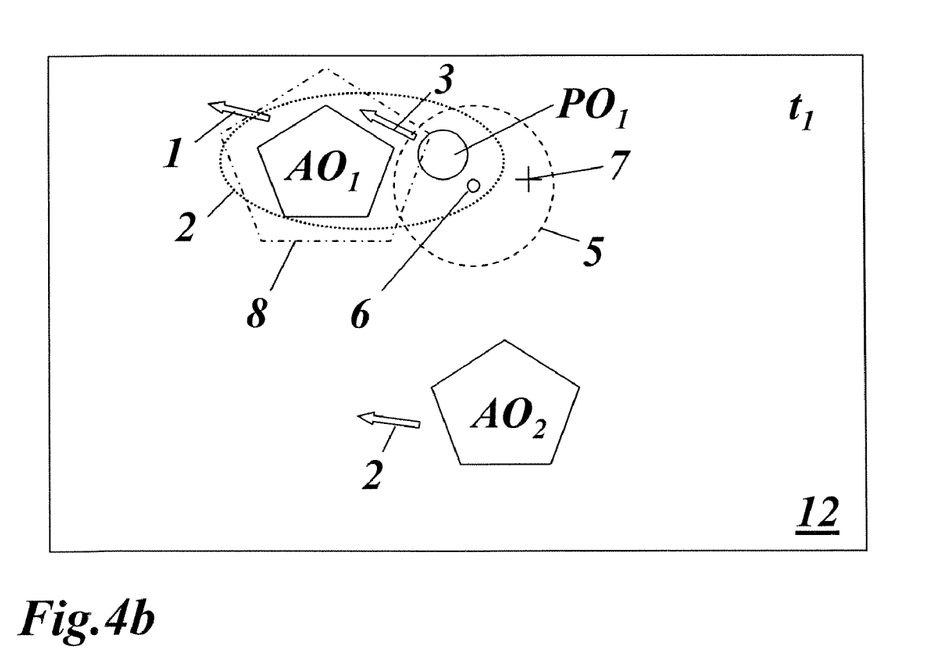

It may be recognised that the simple virtual environment shown in FIGS. 4a and 4b is already very difficult to cognitively perceive for the operating person. If it is assumed that the operating person himself may only control the avatar $AO_2$, and the avatar $AO_1$ is controlled by computer or activated by another operating person, then this first operating person must survey all characteristics of the avatar $AO_2$, and basically also all other characteristics of the remaining objects $AO_1$ and $PO_1$, including their movement. In reality however, this is comparatively simple for the characteristics of the avatar $AO_2$, since human sensory system itself renders these characteristics "feelable" as a whole and in a rapid manner. In a virtual environment or a simulation environment, these characteristics may only be conveyed to the operating person via an interface, typically via an optical display with numbered details, e.g. on energy reserve, speed, "feel-well points" etc. . . . . With conventional interfaces then, as has been initially described, one assumes that the operating person perceives all parameters of his own avatar $AO_2$ (and the ball $PO_1$ as the case may be) is a quasi permanent manner and combines these functionally in a continuous manner, in order to activate an initial-parameterised release movement. The conventional IPRM-control is thus effected in a manner such that the operating person at the moment concerned, i.e. at the point in time $t_0$, perceives all characteristic of the avatar $AO_2$ via display units (or has called up or memorised these previously), combines these with one another, and thereupon carries out an action via an input device, e.g. by way of a computer mouse, which influences the movement of the passive object $PO_1$, so that this is moved to a target point 7. As reminder, it is repeated that although the alternative NBM-controls permitted the passive object $PO_1$ to be controlled directly onto a target point 7, thereby however they ignore the object characteristics of the avatar $AO_2$. In the case of the IPRM-control, with this, the target position is predefined by the initial parameters at the point in time $t_0$, and a spot-on, fixedly written target at the point in time $t_1$ is predefined with NPM-controls.

The man skilled in the art recognises the fact that both possibilities of an IPRM- and NPM-control may only be used with very simplified models and simulation environments. It is evident that the operating person at a certain point in time only has a very limited overview of all parameters and characteristics of the various objects, specifically when there are far more than are shown in the present FIGS. 4a to 4b. With conventional methods and devices, this leads to the fact that the operating person bases his influence on the very few parameters which he is able to perceive at all. Due to this fact, conventional simulations or virtual environments must undergo a very simple parameterisation or slow operating sequences, in order to remain operable at all.

The alternative conventional possibility of fixedly setting a target point 7 leads to an extraordinary large, unacceptable simplification of the simulation environment, since in reality, one is not in the position of being able to regularly control an object movement in a spot-on manner. Accordingly, it would be a huge simplification unusable within the framework of the invention, should one wish an avatar to position a ball at the point in time $t_1$ in a spot-on manner, since in this case one would assume the first to have an absolute target accuracy. It is here that—as already mentioned further above—the inventive concept of a target-parameterised release movement control comes into its own. This hereinafter, proceeding from FIG. 4a, is again described by way of the present example with a first and second avatar $AO_1$, $AO_2$ and a ball $PO_1$. The operating person optically perceives both avatars $AO_1$, $AO_2$ and recognises their movement direction and possibly a few—but not necessarily all—further characteristics of these avatars, such as their size and speed. If it is now the intention of the operating person to play the moved ball $PO_1$ with his avatar $AO_2$ to the first avatar $AO_1$, before this he merely needs to recognise that the first avatar $AO_1$ in a temporally successive moment $t_1$ (cf. FIG. 4b) gets into a (estimated) local region 2, represented by an elliptical region indicated with a dotted line. It is essential to recognise that this local region 2 may not be fixedly predicted by the operating person and thus may also not be exactly determined. Rather, it is thereby the case of an intuitive zone assumed by the operating person and corresponding to real life, which is usually not represented on the display device 12.

Then the operating person—differently to the state of the art—does not activate his own avatar $AO_2$ in order to move the ball $PO_1$, and also does not move the ball $PO_1$ directly to a target point 7, but with an input device (e.g. a mouse), as is shown in more detail in FIG. 4b, controls a parameterised target area 5 into the vicinity of this local region 2. The parameterised target area 5 is preferably defined by a circular geometry, but with a particular embodiment may also have an elliptical, square or other 2-dimensional or spatially (3-dimensional) defined geometry. The shape and size of the parameterised target area 5 thereby depend on the technical conditions and are determined by way of modelling real conditions.

The particularity of the TPRM-control then lies in the fact that the size of the parameterised target area and its possible position are not set in a fixed manner, but computed aided by computer in dependence on the characteristics of the avatar $AO_2$ (and of the ball $PO_1$ as the case may be) or expressed generally, of the second active object $AO_2$ (and of the passive object $PO_1$ as the case may be), or their characteristics. In other words, the operating person does not need to know or even cognitively process all these characteristics, as with the state of the art, but recognises directly from the size of the parameterised target area 5 or the possibilities of its positioning, as to where the ball $PO_1$ or the passive object $PO_1$ may be moved.

The centre 6 of the parameterised target area 5 is represented for this purpose. It is furthermore possible for a possible zone of this centre 6 to be indicated to the operating person by optical markers (not represented in FIG. 4b), wherein this zone is determined by the previously mentioned characteristics. The operating person may now move the parameterised target area 5 into the local region 2 recognised by him, and place this there. This parameterised target area may be placed in a direct manner by a pointing device, or be drawn to the desired region on the display device with inertias imitating reality, depending on the simulation or the virtual environment.

The status of the game action at a moment $t_1$ which is successive to that of FIG. 4a, is represented in FIG. 4b. The operating person here has placed the parameterised target area 5 overlapping with the local region 2. One may easily recognise that the parameterised target area 5 neither coincides with the local region 2 nor is it centred to this, but intersects this in an overlapping manner. The blurring results on account of real cognitive, but also physical inaccuracies of the operating person.

The fact that the ball $PO_1$ does not lie in the parameterised target area 5 in a centred manner, i.e. in its centre 6, but *eccentrically but within the target area 5, may be easily recognised. This behaviour serves its purpose according to the invention. Since, within the framework of the invention, simulations are to be imitated as true as possible to reality, it would be unnatural to permit the operating person an exact positioning of the ball $PO_1$. It is indeed the purpose to determine the parameterisation of the target area 5 in dependence, amongst other things, on the characteristics of the avatar $AO_2$ controlled by the operating person. A hundred percent accuracy is however not true of reality. Here, one may think of a footballer who plays a ball with professional accuracy. His pass too, with a degree of variation, would reach a target in a largely accurate manner, but not in a spot-on manner—and depending on the application, this inaccuracy may lie in the range of meters or millimeters. In the example according to FIG. 4b, a dot-dashed pentagon is assigned to the first active object or the avatar $AO_1$, and this represents the active region 8 of the avatar $AO_1$. One may recognise that the ball $PO_1$ here still just overlaps the active region 8 of the avatar $AO_1$, and by way of this may be affected or played by this in a next time interval $t_2$. The movement directions 1, 2, 3 of the objects $AO_1, AO_2, PO_1$ at the point in time $t_1$ are likewise indicated in FIG. 4b.

It is clear on account of this description of the basics, that the operating person at a certain point in time $t_n$ needs only to perceive comparatively few simulation parameters. The parameterised target area 5 indirectly shows him the possibilities or characteristics of the active object $AO_2$ controlled by him. In other words, the operating person thanks to the TPRB-control, at a point in time $t_0$, may concentrate on a successive condition of the game action at a point in time $t_1$. The conversion of the object characteristics into a parameterised target area is assumed by a computer. This interface control imitating an "intuitive feeling/foresight" thus in a new way represents a control in a significantly more accurate manner, and thus represents an effective reality in a new way and a significantly more accurate manner. This in turn is comparable to a football player who "feels" that he may kick the ball into a certain goal corner, wherein he intuitively "perceives" the movements of other players or the ball, without naturally for his part, having to make computations, having to concentrate on the playing leg, or computing individual physical parameters.

It is rather a computation unit (cf. FIG. 1) which continuously computes the target parameters and the parameterised target area 5 in dependence on the parameters influencing the target area. In particular cases, the target area may additionally be dependent on environmental parameters such as wind speed, temperature etc.

The previously mentioned eccentric positioning of the passive object $PO_1$ (a ball in the example) within the parameterised target area 5, is fixed by the operating person after the confirmation of the parameterised target area. The exact position after this confirmation, or in order not to cause any latent times, may be determined already previously relative to the parameterised target area by the computation unit. Thereby, the definitive position of the object $PO_1$ in the parameterised target area is determined whilst applying a random function.

The interface control according to the invention thus simulates reality, and permits an operating person much more accurate object movements, without however an unnatural exactness (in the context of a spot-on coordinate) entering into the method. With the method, the operating person is permitted to carry out true-to-life object movements on a display device, with a reduction of the cognitive effort for this, which leads to a greater recognition speed and a more accurate and closer-to-reality movement control on the display device. As a whole, a significantly better and quicker perception of a simulation- or virtual environment is effected.

The device for carrying out the method according to the invention according to FIG. 1 comprises a computation unit 11 which may be formed by a local computer, such as a personal computer, a game console etc., but also by way of a computer or server which may be connected via a network (not shown). A keyboard 13, a pointer device 15 (trackball, mouse or suitable pointing devices) a display device 12, e.g. a screen and/or as the case may be, a helmet display or a suitable display unit (console screen) are provided with the computation unit 15. Furthermore, preferably a special joystick for the activation of the parameterised target area 5 may be provided on the display device 12 or the helmet display. According to the invention then, a special parameter device 25 with or without an optical display are provided for particular embodiment forms.

This parameter device 25, depending on the application, serves for different purposes. In the simplest case, the parameter device 25 consists of a memory unit which may be connected via a standard interface, such as USB, bluetooth, firewire or suitable interfaces. The parameter device 25 permits the storage of characteristics of certain objects or system environments. For example, the characteristics of one or more active objects $AO_n$, e.g. the charactersists of a certain avatar, may be stored in the parameter device. Preferably, the parameter device 25 has an encoding, e.g. a biometric security system, so that the concerned data are not easily accessible to third parties. A certain operating person may thus take this parameter unit separate from the computation unit 11, and may apply the parameter unit 25 e.g. at a different computer. A write/read memory contained in the parameter unit 25 furthermore permits the feeding of data, or lets the data be fed to third apparatus. In the case of computer games, it is possible for example to purchase or obtain free of cost certain characteristic in dedicated shops. These new or supplementary characteristics may then be applied on connecting the parameter unit 15 to the computer. It is furthermore possible for the parameter unit 25 to contain data on the simulation environment or virtual environment. The necessary functions of the parameter unit 25 on application may be operated separate from the computation unit 11 by way of special operating keys.

The parameter device 2 may also have a display 27. Characteristics and parameters in the framework of a text display may be represented on this display. In a preferred embodiment, the parameter device 25 permits the optical-graphic display of a parameterised target area. A continuous and extremely rapid recognition of the target parameters may be recognised by the display of the size, here in the form of a circle 28. The "inexactness" of the target environment may be perceived by way of the size of the circle. By way of this optical representation, the operating person at a glance may recognise the central target parameters for the parameterised target area 5, before fixing this, on the display device 12, without having to evaluate any text information.

The man skilled in the art recognises that the display 27 of the parameter device 25 may also be issued directly on the display device 12 in simpler embodiments. The functionality of this display region corresponds to the display 27, but as a rule does not allow data to be simply adopted by another computers via hardware interfaces. It is of course possible for respective data to be played in via network connections, but such a transmission is not desired, depending on the application, e.g. for security reasons. A corresponding display region may be provided in a corresponding manner also with a helmet display.

It is to be noted that the display 27 or the display regions on the display device 12 or in the helmet display is to be distinguished clearly from the parameterised target area 5. The former serve for the optical predisplay and control by the operating person before the target area is positioned by him. The positioning and possible change/control of individual target parameters may be carried out by the operating person via input units 13, 14, 15 or as the case may be, via operating keys 26 of the parameter unit 25.

In particular with the application of a helmet display or with several display devices 12, it is possible to separate the environment display or the display of the virtual reality from the predisplay of the target parameters or, with the application of a display device 12 and a helmet display, to optically superimpose these. The same is also possible for the parameterised target area 5.

The invention claimed is:

1. A method performed by a computing system to control movement of a simulated object in a game environment, the method comprising:
    displaying a representation of a game environment on a display of the computing system, the game environment including a plurality of game figures that play with or against each other in a simulated ball game or sport event involving a movable object;
    receiving, via an input device of the computing system, user input that causes a visual representation of a target area to be moved to a user-selected position in the game environment, said target area representing a desired region to which the movable object is to be moved by action of a game figure that strikes or throws the movable object, said target area having a shape and size;
    receiving user input that causes the game figure to be moved to a starting location from which the movable object is to be stricken or thrown;
    selecting an end point in said target area as positioned by the user, said end point being an end of a path to be followed by the movable object when the game figure strikes or throws the movable object, wherein the computing system selects said end point by using a random function to select from possible end points falling within the positioned target area; and
    after the end point is selected in the positioned target area, determining said path to be followed by the movable object from the starting location to the end point.

2. The method of claim 1, wherein the method further comprises the computing system selecting the size of the target area based on one or more parameters, such that the size is not directly specified by the user, said size affecting a degree to which the user can accurately control movement of the movable object.

3. The method of claim 2, wherein the one or more parameters include a hit intensity selected by the user for hitting the movable object.

4. The method of claim 2, wherein the one or more parameters include a hit type selected by the user for hitting the movable object.

5. The method of claim 4, wherein the method comprises receiving input from the user, via said input device, that simultaneously specifies both the hit type and the position of the target area.

6. The method of claim 2, wherein the one or more parameters include an object movement speed specified by the user for movement of the object to the end point.

7. The method of claim 6, wherein the computing system selects the size of the target area such that the size is directly proportional to the object movement speed.

8. The method of claim 2, wherein the one or more parameters include one or more physical characteristics of the player figure.

9. The method of claim 8, wherein the one or more physical characteristics include a fatigue level of the player figure.

10. The method of claim 8, further comprising varying the one or more physical characteristics of the player figure over time, such that a degree of object-movement accuracy associated with the player figure changes over time via adjustments in the size of the target area.

11. The method of claim 2, wherein the one or more parameters include at least a speed with which the player figure is moved to the movable object to strike the movable object.

12. The method of claim 2, wherein the one or more parameters include a location of the starting point.

13. The method of claim 1, wherein the method further comprises the computing system selecting a size of the target area based on one or more parameters, such that the size is not directly specified by the user.

14. The method of claim 1, wherein the random function uses a probability distribution to select the end point from possible locations in the positioned target area.

15. The method of claim 1, wherein the movable object is a ball.

16. A computer-readable, non-transitory storage medium that stores executable instructions that direct a computing system to perform a method that comprises:
    displaying a representation of a game environment on a display of the computing system, the game environment including a plurality of game figures that play with or against each other in a simulated ball game or sport event involving a movable object;
    receiving, via an input device of the computing system, user input that causes a visual representation of a target area to be moved to a user-selected position in the game environment, said target area representing a desired region to which the movable object is to be moved by action of a game figure that strikes or throws the movable object, said target area having a shape and size;
    receiving user input that causes the game figure to be moved to a starting location from which the movable object is to be stricken or thrown;
    selecting an end point in said target area as positioned by the user, said end point being an end of a path to be followed by the movable object when the game figure strikes or throws the movable object, wherein the computing system selects said end point by using a random function to select from possible end points falling within the positioned target area; and after the end point is selected in the positioned target area, determining said path to be followed by the movable object from the starting location to the end point.

17. The computer-readable medium of claim 16, wherein the method further comprises the computing system selecting the size of the target area based on one or more parameters, such that the size is not directly specified by the user, said size affecting a degree to which the user can accurately control movement of the movable object.

18. The computer-readable medium of claim 17, wherein the one or more parameters include a hit intensity selected by the user for hitting the movable object.

19. The computer-readable medium of claim 17, wherein the one or more parameters include a hit type selected by the user for hitting the movable object.

20. The computer-readable medium of claim 17, wherein the one or more parameters include one or more physical characteristics of the player figure, and the method further comprises varying the one or more physical characteristics of the player figure over time, such that a degree of object-movement accuracy associated with the player figure changes over time via adjustments in the size of the target area.

21. The computer-readable medium of claim 16, in combination with said computing system.

* * * * *